United States Patent [19]
Benn et al.

[11] Patent Number: 6,038,673
[45] Date of Patent: Mar. 14, 2000

[54] COMPUTER SYSTEM WITH POWER MANAGEMENT SCHEME FOR DRAM DEVICES

[75] Inventors: Samuel D. Benn, Folsom; Michael W. Williams, Citrus Heights, both of Calif.

[73] Assignee: Intel Corporation, Santa Clara, Calif.

[21] Appl. No.: 09/186,290

[22] Filed: Nov. 3, 1998

[51] Int. Cl.[7] ....................................... G06F 1/32
[52] U.S. Cl. ..................... 713/323; 713/300; 713/320; 365/227
[58] Field of Search ...................... 713/300, 324, 713/340, 323, 320, 321; 710/1, 18, 15; 714/22, 24; 711/100, 105, 132; 365/227, 229

[56] References Cited

U.S. PATENT DOCUMENTS

| | | | |
|---|---|---|---|
| 4,616,346 | 10/1986 | Nakaizumi et al. | 365/229 |
| 5,396,635 | 3/1995 | Fung | 713/323 |
| 5,473,767 | 12/1995 | Kardach et al. | 713/600 |
| 5,687,123 | 11/1997 | Hidaka et al. | 365/189.09 |
| 5,721,935 | 2/1998 | DeSchepper et al. | 713/323 |
| 5,740,118 | 4/1998 | Sato et al. | 365/222 |
| 5,740,454 | 4/1998 | Kelly et al. | 713/320 |
| 5,754,436 | 5/1998 | Walsh et al. | 713/300 |
| 5,784,628 | 7/1998 | Reneris | 713/300 |
| 5,796,992 | 10/1998 | Reif et al. | 713/500 |
| 5,822,597 | 10/1998 | Kawano et al. | 713/323 |
| 5,822,600 | 10/1998 | Hallowell et al. | 713/340 |
| 5,826,092 | 10/1998 | Flannnery | 713/324 |
| 5,845,140 | 12/1998 | Stanley et al. | 713/324 |
| 5,860,106 | 1/1999 | Domen et al. | 713/324 |
| 5,884,088 | 3/1999 | Kardach et al. | 713/324 |
| 5,913,067 | 6/1999 | Klein | 713/300 |
| 5,953,246 | 9/1999 | Takashima et al. | 365/149 |

*Primary Examiner*—Gopal C. Ray
*Attorney, Agent, or Firm*—Blakely, Sokoloff, Taylor & Zafman LLP

[57] ABSTRACT

A computer system employs DRAM devices in a memory sub-system, which devices are assigned into particular pools corresponding to different power consumption states with a most-recently-accessed (MRA) device being assigned to an active pool and placed at the top of a stack structure. A LRA device in the active pool is evicted from the active pool and placed in a standby pool when the active pool is full and the processor accesses another device, which is not currently assigned to the active pool. A LRA device of the standby pool gets evicted into a nap pool upon one of two conditions: either a timeout occurs, or the standby and active pools are full and the processor accesses another device, which is not currently assigned to either the active or standby pools.

24 Claims, 5 Drawing Sheets

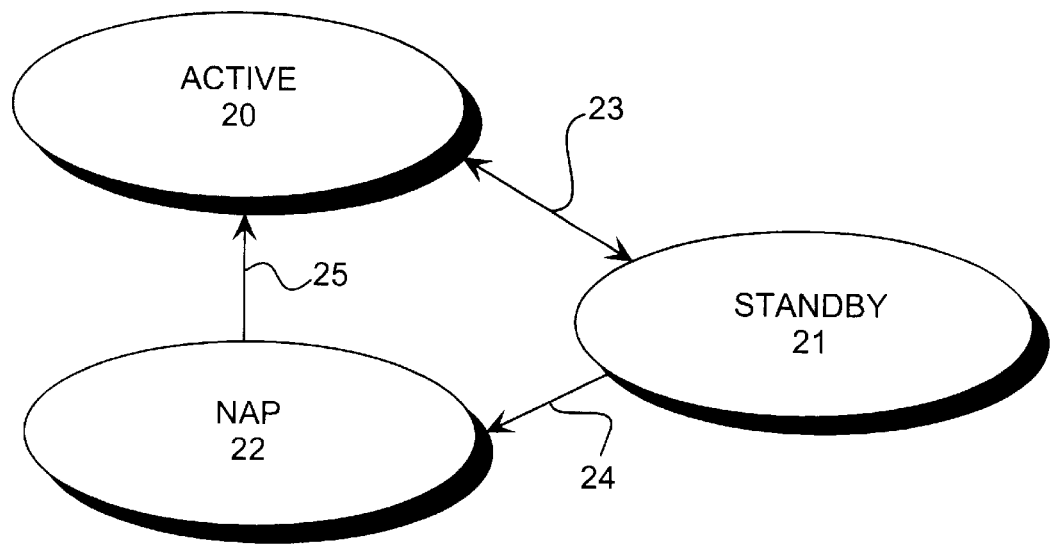
FIG. 1
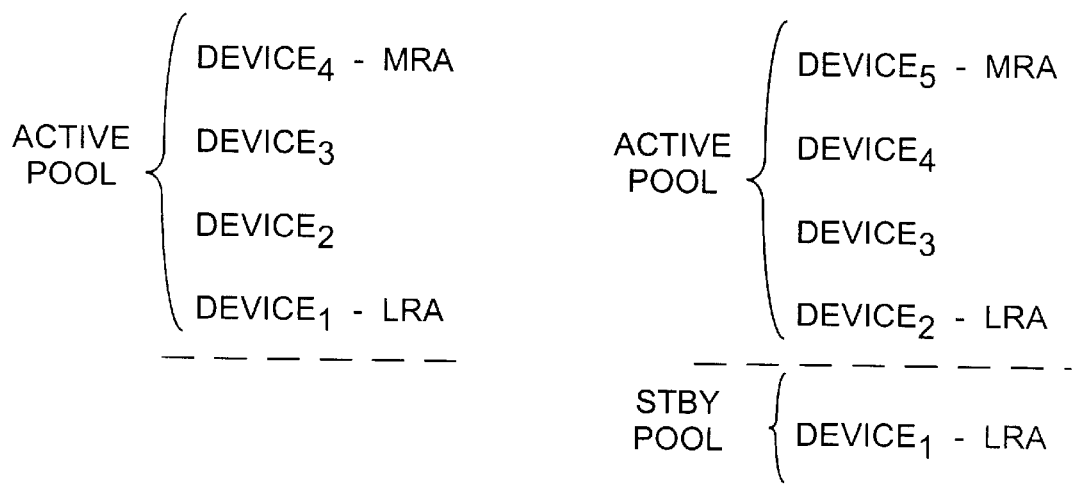
FIG. 2A  FIG. 2B

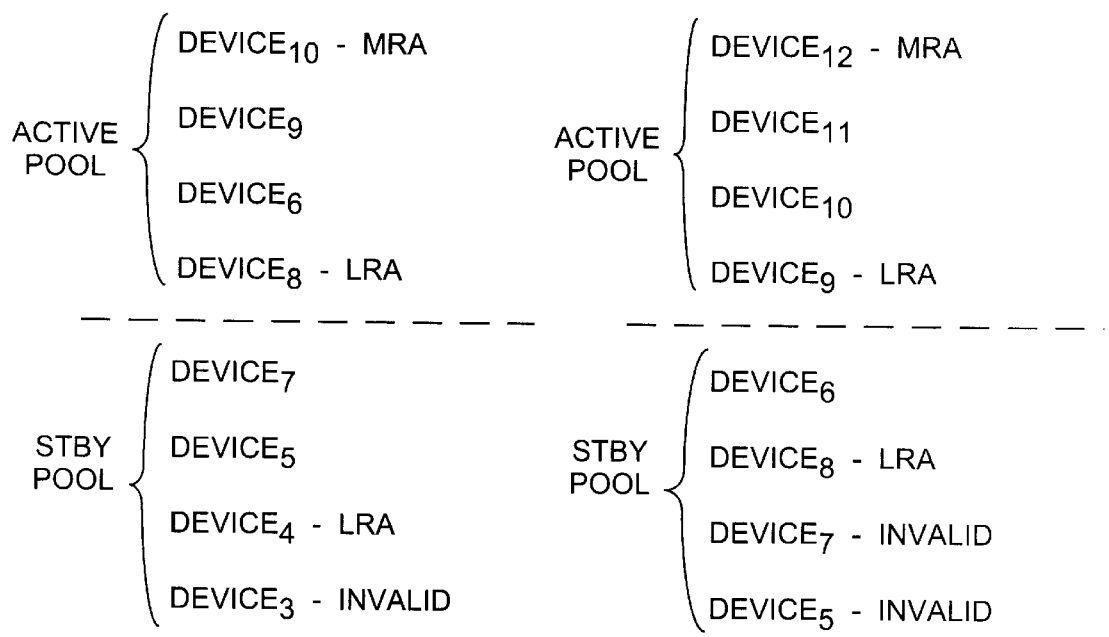

6,038,673

COMPUTER SYSTEM WITH POWER MANAGEMENT SCHEME FOR DRAM DEVICES

FIELD OF THE INVENTION

The present invention relates generally to the field of computer systems; more specifically, to methods and apparatus for managing power usage within such systems.

BACKGROUND OF THE INVENTION

It is not surprising that the newer, higher-performance computer systems, which provide larger data handling capabilities at higher speeds, require more operating power. The larger power requirements of modern computer systems can easily strain the available power in laptop, notebook, and other portable computer devices. In response, practitioners in the computer industry have developed various mechanisms aimed at efficient management of the power resources of a computer system.

While numerous advances have been made in the management of power usage by the central processing unit (CPU), relatively few system designs have addressed the problem of controlling power at the memory sub-system level of a computer. Yet, newer dynamics, random-access memories (DRAMs) have significantly higher power requirements than conventional DRAM devices (such as FPM, EDO, and SDRAM). For this reason, it has become necessary for computer chipset designs to include some mechanism for managing the power states of these newer DRAM devices.

SUMMARY OF THE INVENTION

The present invention provides a novel power management scheme for a computer system that employs DRAM devices at the memory sub-system level. According to the invention, DRAM devices are placed into appropriate power consuming states based on frequency of usage. That is, memory devices that are most recently accessed are placed in a fully active state, whereas devices that have not been accessed for some time, if at all, are maintained in an idle, or nap state. In one embodiment, an intermediate, standby state is also included.

According to a particular implementation of the present invention the computer system includes a processor that operates to selectively access data or other information stored in the DRAM devices. The computer includes a stack structure and assignment of devices into particular pools corresponding to different power consumption states. A most-recently-accessed (MRA) device is assigned to an active pool and the MRA device is placed at a top-of-stack (TOS) position. The active pool has a predetermined size with a certain stack position representing a least-recently-accessed (LRA) device in the active pool.

The LRA device is evicted from the active pool and placed in a standby pool when the active pool is full and the processor accesses another device, which is not currently assigned to the active pool. The standby pool also has a LRA device that is identified by a pointer. The LRA device identified by the pointer gets evicted from the standby pool and is placed in a nap pool when a timeout condition occurs.

In one embodiment, the timeout condition comprises a number of clock cycles of the processor. Another way that the LRA device can be evicted from the standby pool to the nap pool is when the standby and active pools are full and the processor accesses another device, which is not currently assigned to either the active or standby pools.

BRIEF DESCRIPTION OF THE DRAWINGS

The present invention is illustrated by way of example, and not by way of limitation, in the figures of the accompanying drawings, where:

FIG. 1 illustrates the various power management states employed in one embodiment of the present invention.

FIGS. 2A–2H are examples that illustrate the stack and shift operations utilized in one embodiment of the present invention.

DETAILED DESCRIPTION

Figure 2C:
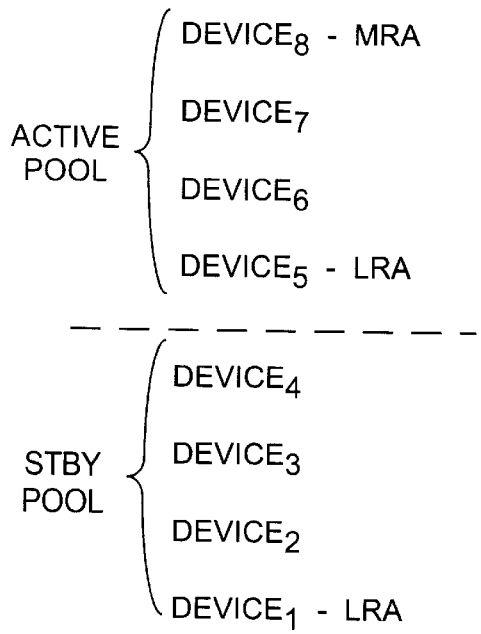

Throughout the following description specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative, rather than a restrictive, sense.

FIG. 1 is a state diagram representing the different power states that are available for the DRAM devices in the memory subsystem of a computer constructed according to the present invention. DRAM devices are assigned to these different states, or pools, depending on how recently the particular device has been accessed by the memory requestor (e.g., CPU) of the computer system. (In the context of this description, the terms "pool" and "state" are used interchangeably.) In FIG. 1, three device pools are shown: an active pool 20, a standby pool 21, and a nap pool 22.

When the computer system is first powered-up, or upon reset, none of the DRAM devices are in the active state. Rather, all of the DRAM devices are in the default pool until the CPU (or some other processor in a multiprocessor system) has accessed them. The default state may either be standby state 21 or nap state 22. In the embodiment described herein, the default state is nap state 22. That is, all of the DRAM devices are in the nap state until they have been accessed by a processor of the computer system.

When the processor accesses a device, it is brought out of nap pool 22 and placed into active pool 20. This occurrence is denoted by line 25 in FIG. 1. In a current implementation, the nap state represents a powered-down operational mode in which only the internal ring oscillator of the DRAM device continues to run. The ring oscillator provides a time base during self-refresh of the core memory cells.

DRAM devices in standby pool 21 are in an intermediate, reduced-power state. In this standby state, a DRAM device has certain pins turned off; however, the device still provides power to circuitry is responsive to the system clock signal; also, the internal clock generator of the device is kept running. Power is also consumed in the input/output (I/O) portion of the DRAM devices. Active pool 20 represents the normal or full-power state of the DRAM device, wherein all circuit functions are completely operational.

As shown in FIG. 1, when the requestor accesses a DRAM device, it may either be in standby pool 21 or in nap pool 22. When a device in standby pool 21 is accessed, that device is brought into active pool 20, as shown by directional arrow 23 in FIG. 1. As will be described in more detail shortly, devices in standby pool 21 which remain idle for a certain time duration (i.e., not accessed) eventually are returned to nap pool 22. This event is indicated by arrow 24.

According to the invention, DRAM devices that are brought out of nap pool 22 and placed into active pool 20 are stacked and shifted according to the order in which they arrived in the pool. FIG. 2A illustrates an example in which four devices have been accessed. The four DRAM devices were accessed in the following order: $Device_1$, $Device_2$, $Device_3$, $Device_4$.

In one embodiment, both the active pool 20 and standby pool 21 have predetermined sizes. In the example of FIG. 2A, for example, the size of the active pool is set at four. This size value may be programmed into the computer system in a variety of ways. By way of example, a register of the CPU may be utilized to set the maximum size of the active pool 20. Alternatively, a non-volatile memory location in the basic input/output system (BIOS) of the computer may be written with a value setting the active pool size. Similarly, another register or memory location may be utilized to set the size of the standby pool 21.

In one programming model, two register fields are utilized: one which indicates the size of the active pool and another which indicates the total pool capacity. In this model, the standby pool size is equal to the total pool capacity minus the active pool size. In the examples of FIGS. 2A–2H, the total pool capacity is eight and the active pool size is four. By subtraction, the standby pool size is also equal to four devices. Let it be noted that the size of nap pool 22 is not set or tracked in accordance with the embodiment described herein. Rather, devices that are neither in active pool 20 or standby pool 21 must, by default, be in nap pool 22.

Continuing again with the example of FIG. 2A, the most recently accessed (MRA) device is $Device_4$. The least recently accessed (LRA) DRAM device in the computer system is $Device_1$. If the processor issues another access to $Device_4$, then the stack shown in FIG. 2A remains the same. If, however, another access to $Device_2$ occurs, then $Device_2$ will be moved to the top of the stack and represents the MRA of the active pool. In that situation, $Device_4$ and $Device_3$ will be shifted down the stack one position, with $Device_1$ remaining the LRA device of the active pool.

It should be understood that the LRA device in active pool 20 is simply determined by the size of the active pool. On the other hand, the MRA device is always at the top-of-stack position. Note that the bottom of the stack is always the LRA device. Again, this is determined by the active pool size. In the example of FIG. 2A, the active pool size is four, so position #4 is always the LRA position. This means that no device is designated as the LRA device for the active pool until the active pool is full. It should be kept in mind that the active pool size is programmable, which means that a pointer is not needed. For instance, if the size of the active pool is set to 2, then the second slot or position in the stack structure represents the LRA device.

Practitioners in the art will appreciate that the determination of the active and standby pool sizes is typically made based on system considerations. For example, different systems may be configured in ways that require larger or smaller active pool sizes. Various power or thermal requirements may dictate the size of the active pool or the total pool capacity. For instance, some systems may have better heat dissipation capabilities thereby permitting more DRAM devices to remain in the active state. Such systems may be capable of having larger active poor sizes than other systems that have relatively pool heat dissipation capabilities. The determination of the various pool sizes therefore is primarily based on the thermal and power envelopes of the particular system configuration.

Turning our attention now to FIG. 2B, the stack structure of FIG. 2A is shown following an additional access to DRAM $Device_5$. According to the stack-and-shift principle of operation, $Device_5$ is placed at the top-of-stack position. As such, it is the MRA device in the active pool. Each of the remaining devices is shifted down one position in the stack as a result of $Device_5$ being brought into active pool 20. However, since the active pool was previously full, $Device_1$ gets evicted from active pool 20 and is placed into standby pool 21. This is because $Device_1$ was the LRA device in the active pool prior to the new access to $Device_5$. In other words, once the active pool capacity is reached, LRA devices are removed from active pool 20 and put into standby pool 21. These DRAM devices are stacked and shifted according to the order in which they arrived in standby pool 21. Standby pool 21 operates with the same stack structure as active pool 20, except that standby pool 21 includes a pointer that shifts to the current LRA device.

The example of FIG. 2C represents the stack structure of FIG. 2B following additional accesses to $Device_6$, $Device_7$, and $Device_8$, in that order. Following the three additional accesses, $Device_8$ is now the MRA of the active pool and $Device_5$ is the LRA of the active pool. $Device_1$, $Device_2$, $Device_3$, and $Device_4$ have been shifted into standby pool 21. Note that in the example of FIG. 2C, the current LRA pointer points to $Device_1$. Hence, the example of FIG. 2C illustrates both the active and standby pools being fully populated. In this situation, if a DRAM device that is already in the active pool gets accessed again, say $Device_6$, then the order of active pool is simply shifted.

Figure 2D:
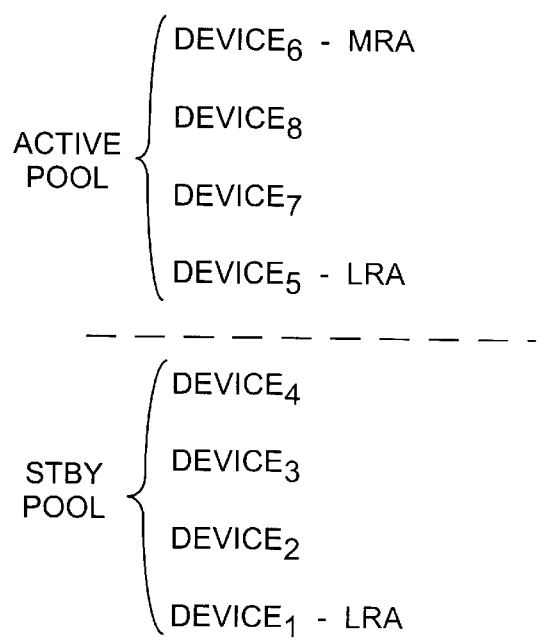

This situation is illustrated by the example of FIG. 2D where $Device_6$ is shown occupying the MRA position, with $Device_8$ and $Device_7$ being shifted down one position in the active pool. Note that $Device_5$ still remains the LRA device in the active pool. The order of the standby pool is unaffected in this case. If, however, a completely new DRAM device is accessed and placed in the active pool, say $Device_9$, then $Device_5$ would be evicted into the standby pool. But because the standby pool is full, this means that the least recently accessed device in the standby pool gets evicted into the nap pool. In the example just described, the standby pool stack structure would be ordered: $Device_5$, $Device_4$, $Device_3$, and $Device_2$.

The examples provided up to this point have shown how the active and standby pools get populated. As explained, once a device has been accessed it gets removed from either the nap or the standby pools and is placed in the active pool. When the active pool is full and an access occurs to a device that is not already in the active pool, the least recently accessed device from the active pool is evicted into the standby pool.

Ordinary logic circuitry associated with the stack structure tracks both the active and standby pools. Any DRAM device that is newly accessed has its ID compared to the devices already present in both the active and standby pools. The reason why this is done is because the newly accessed device could already exist in either the active or the standby pools. If the device is already in the active pool, the stack ordering in the active pool is simply shifted around; the stack order of the standby pool does not change. On the other hand, if the newly accessed device is already present in the standby pool, it is removed from the standby pool and placed into the active pool. The LRA device in the active pool is then evicted into the standby pool.

Devices are removed from the standby pool and put into the nap pool one of two ways. First, if both the active and standby pools are full, and a completely new device (one that is not already in the active or standby pools) is accessed, the device in the standby pool LRA position is evicted into the nap pool.

DRAM devices can also be evicted from the standby pool to the nap pool based on the occurrence of a timeout condition. As previously discussed, the standby pool LRA position moves up and down the stack depending on the type of events that are taking place within the pool. A pointer is utilized to identify a current LRA device in the standby stack based on the order in which it was placed into the standby pool. Once the pointer identifies a device as the current LRA device in the standby pool, the timer starts counting. After a predetermined duration of inactivity in the standby pool, the LRA device in the standby pool gets evicted into the nap pool. When this happens, the pointer moves up the stack and begins counting anew.

Figure 2E:
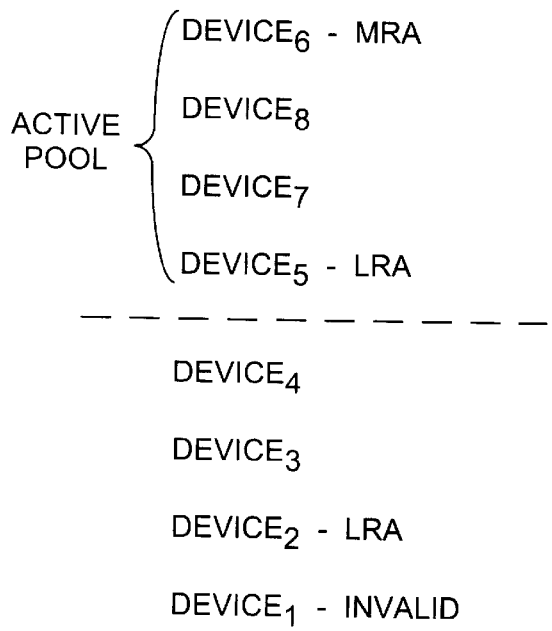

This operation is illustrated in FIG. 2E, which shows the contents of the stack of FIG. 2D following a timeout event. In this scenario, $Device_1$ gets evicted from the standby pool and put into the nap pool. Also, the pointer moves up to identify $Device_2$ as the current LRA device. In this implementation, the pointer continually moves up the stack upon every timeout event. The pointer is also part of the decoding formula that generates an invalid bit for DRAM devices removed from the standby pool and placed into the nap pool. The pointer only moves down the stack when devices are placed into the standby pool from the active pool. Each time this happens, the timer is reset. Once the pointer reaches its maximum LRA location (depending on the size of the standby pool) it stays there until a timeout event occurs.

It should also be understood that the pointer remains in a particular position, other than its maximum LRA location, when a device in the standby pool is upgraded to the active pool. This event resets the timer. In one embodiment, the timeout event is based on a number of clock cycles of the central processor of the computer system. Of course, the length of time for the timeout condition, the maximum LRA position, the sizes of both the active and standby pools, etc., are all details which may vary in system to system.

Figure 2F:
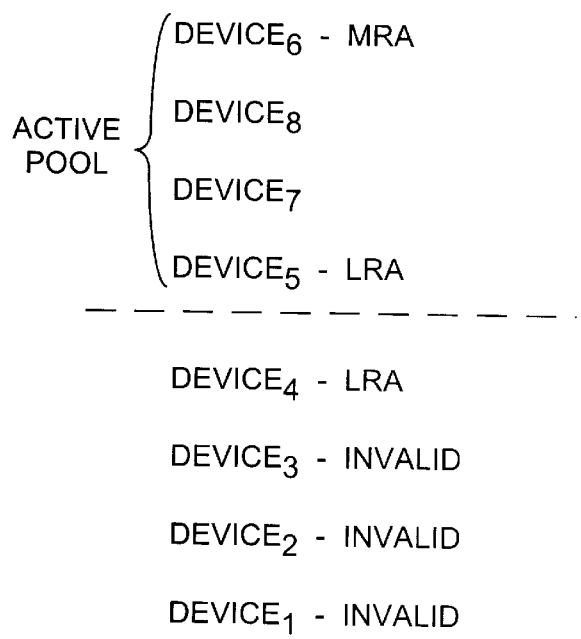

FIG. 2F illustrates the eviction of DRAM devices from the standby pool based on multiple, repeated timeout events. FIG. 2F represents the stack structure of FIG. 2E following two additional timeout events in which no activity occurs with respect to devices in the standby pool. Thus, the example of FIG. 2F illustrates how the pointer walks up the stack in the standby pool, moving the designation of the LRA device in the standby pool up one position each time a device is invalidated and evicted into the nap pool.

Note that in the presently described embodiment, the timer is only utilized to evict DRAM devices from the standby pool to the nap pool, and has no affect on devices in the active pool. In other embodiments, the timer may be utilized to affect the status of devices in both the standby and active pools. By way of example, once the standby pool is emptied, the pointer can be made to continue moving up the stack into the active pool, and begin evicting devices from the active pool into the standby pool based on the occurrence of a timeout condition. Once placed into the standby pool, the timer may further be utilized in the manner described above to evict devices into the nap pool.

Another alternative embodiment has the timer walking up into the active pool, eventually pushing devices directly from the active pool to the nap pool based on inactivity or idleness.

Practitioners will appreciate that these various embodiments are simply a matter of gate cost and relative circuit complexity. Persons of skill will further appreciate that the well-known technique of register renaming can be utilized to implement the present invention. This technique allows registers that identify devices in the active pool to simply be renamed to standby pool registers; from there, a timeout mechanism may be employed to move devices from the standby pool to the nap pool.

Yet another possibility is to move a device directly from the active pool to the nap pool—essentially doing away with the standby pool altogether.

FIG. 2G represents the scenario shown in FIG. 2F following two new accesses to $Device_9$ and $Device_{10}$, in that order. Following the new accesses by the processor, $Device_{10}$ is the MRA device in the active pool and $Device_8$ is the LRA device. Because the active pool was full, each of the new accesses causes a DRAM device to be evicted from the active pool into the standby pool. Hence, the standby pool ordering shown in FIG. 2G has $Device_7$ and $Device_5$ occupying the top two positions in the standby pool.

As previously mentioned, when a new device enters the standby pool, the timer mechanism is reset. This means that the pointer in the standby pool still identifies $Device_4$ as the LRA device. The device identified as the current LRA device in the standby pool remains the LRA device until one of three things happen: (1) either a timeout condition occurs due to inactivity and the current LRA device is evicted into the nap pool; (2) the standby pool is filled to capacity and a new access occurs to a device which is neither in the active pool nor the standby pools; or, (3) the device which is the current LRA of the standby pool is accessed and upgraded to the active pool.

A final example illustrating the theory of operation of the present invention is shown in FIG. 2H. FIG. 2H represents the scenario of FIG. 2G following several new events. In FIG. 2H, the processor has accessed two new DRAM devices: $Device_{11}$, and $Device_{12}$, with $Device_{12}$ being the most recently accessed device in the active pool. Because the active pool was previously full, $Device_8$ and $Device_6$ get shifted down the stack into the standby pool. Because the additional access exceeds the total pool capacity (of the active and standby pools), $Device_4$ is pushed out of the standby pool and is evicted into the nap pool.

After eviction of $Device_4$ into the nap pool, the standby pool remains inactive for a duration that exceeds two timeout events. These two timeout events invalidate $Device_5$ and $Device_7$, evicting them back to the nap pool. The example shows that the pointer has walked up the stack and currently points to $Device_8$ as the LRA device in the standby pool.

Figure 3:
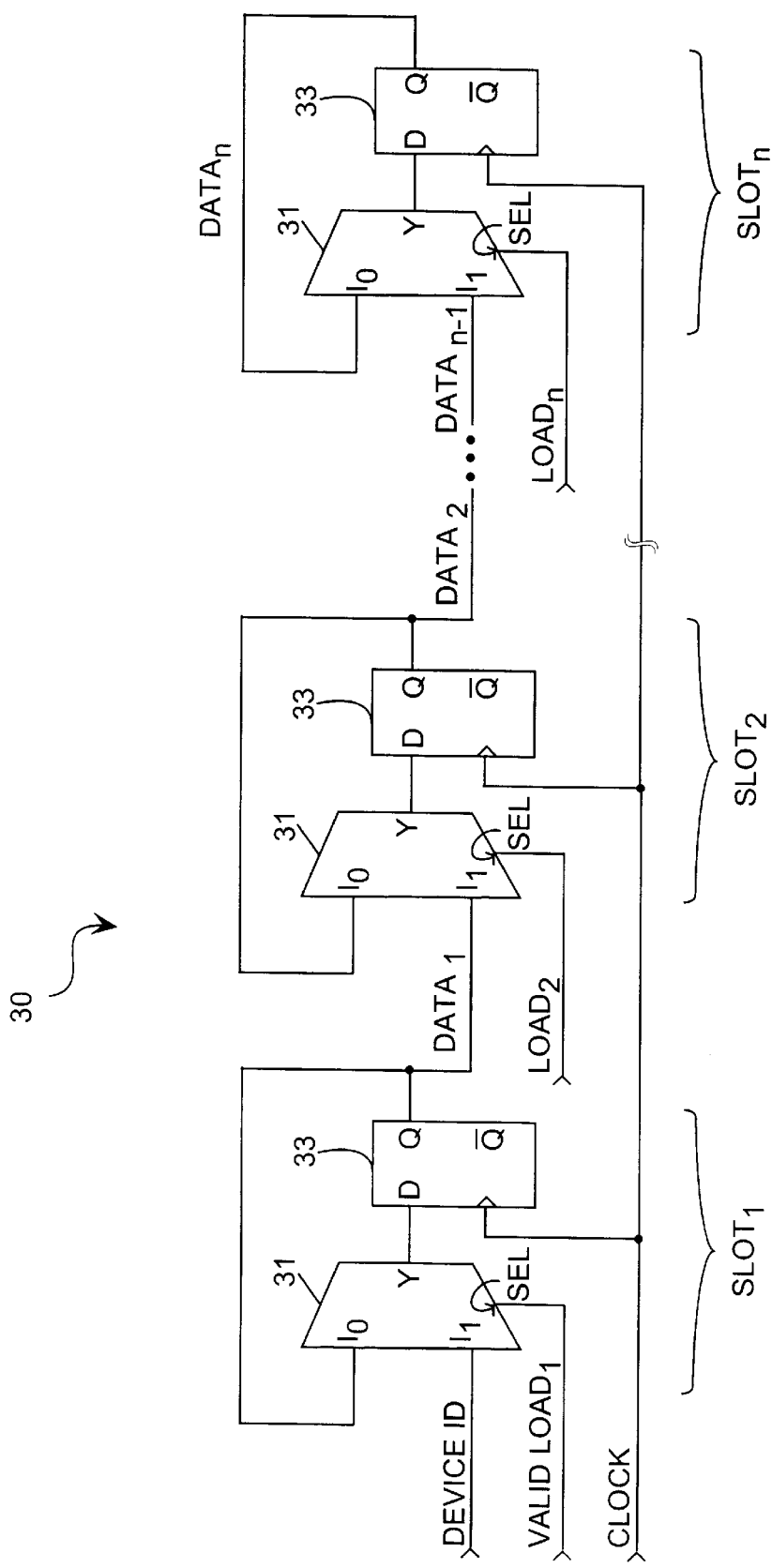
FIG. 3 is detailed circuit schematic diagram of the general pool structure for one embodiment of the present invention.

FIG. 3 is a detailed circuit diagram illustrating the general pool structure 30 of the present invention. Pool 30 comprises multiplexers 31, which store device ID's for slots 1-N. Each slot represents a position in the stack structure. Each multiplexer 31 is coupled to a data latch 33 having an output that is coupled back to one of the inputs of multiplexer 31 in the current slot position. The output of data latch 33 is also coupled to one of the inputs of the multiplexer 31 in the next slot position. A valid load signal is used to select between the two inputs presented to multiplexers 31 on a slot-by-slot basis. An ordinary clock signal is used to latch data into each of the data latches 33. Each of the valid load signals coupled to the select inputs of multiplexers 33 may be generated by an ordinary state machine that tracks the active and standby pools and compares the device ID's contained within those pools with newly accessed devices.

Figure 4:
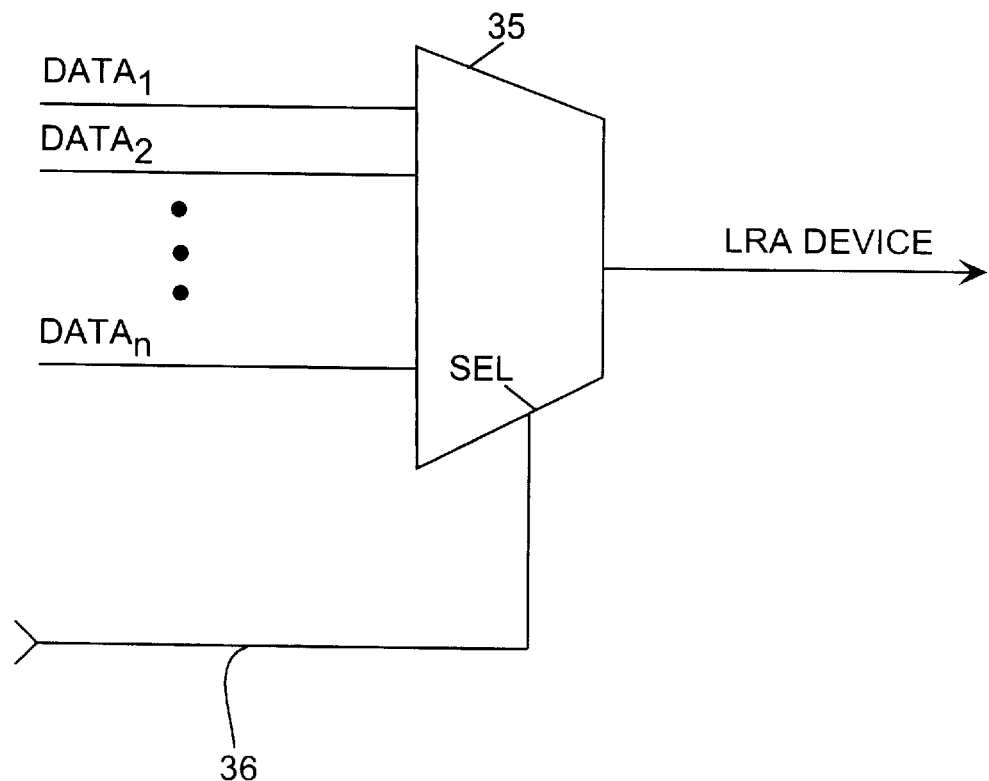
FIG. 4 shows one circuit implementation for selection of a least-recently accessed device in accordance with the present invention.

FIG. 4 is a circuit schematic diagram of one implementation of the LRA device pointer utilized in the standby pool in accordance with one embodiment of the present invention. A multiplexer 35 has a select input signal 36 coupled to the state machine (not shown) that is used to track the active and standby pools. The various inputs into multiplexer 35 represent the data information latched into the various stack positions or slots shown in the pool circuitry 30 of FIG. 3. The current LRA device represents the output of multiplexer 35 based on select input signal 36.

We claim:

1. A computer system comprising:

a central processing unit (CPU);

a memory sub-system that includes DRAM devices coupled to the CPU, the CPU selectively accessing information stored in the DRAM devices;

logic circuitry that assigns the DRAM devices to active, standby, or nap pools based on temporal access of each device by the CPU, the active, standby, and nap pools corresponding to power consumption states of the DRAM devices; and means for storing an active pool size to define a maximum number of devices of the active pool, and a standby pool size to define a maximum number of devices of the standby pool;

wherein the logic circuitry includes a stack structure associated with the active and standby pools in which a most recently accessed (MRA) device is placed in the active pool at a top-of-stack (TOS) position, a least-recently accessed (LRA) device in the active pool being evicted to the standby pool when the active pool is full and the CPU accesses another device, which is neither assigned to the standby nor nap pools.

2. The computer system of claim 1 further comprising:

means for pointing to a LRA device in the standby pool, the LRA device in the standby pool being evicted to the nap pool when the active and standby pools are full and the CPU accesses another device that is in the nap pool.

3. The computer system of claim 1 wherein the logic circuitry further includes:

timer means for evicting the LRA device in the standby pool to the nap pool after a selected duration of inactivity.

4. The computer system of claim 3 wherein the timer means evicts the LRA of the active pool into either the standby or nap pools when the standby pool is empty and the selected duration of inactivity elapses.

5. The computer system of claim 1 wherein an access by the CPU to a device in the active pool does not affect the standby or nap pools.

6. The computer system of claim 1 wherein the selected duration of inactivity comprises a number of clock cycles of the CPU.

7. The computer system of claim 1 wherein the storage means comprises one or more registers of the CPU.

8. The computer system of claim 1 wherein the storage means comprises a memory location associated with a basic input/output system (BIOS) or the computer system.

9. The computer system of claim 1 wherein the storage means is programmable.

10. A computer system comprising:

a bus;

a processor coupled to the bus;

a plurality of DRAM devices coupled to the bus, the processor accessing the DRAM devices via the bus;

a controller that assigns each DRAM device to one of a plurality of pools according to a power consumption state of the DRAM device, the plurality of pools including an active pool that contains devices in a high power consumption state and a nap pool that contains devices in a low power consumption state, the controller having a stack, with a most-recently accessed (MRA) device being assigned to a top-of-stack (TOS) position in the active pool, unaccessed devices being assigned to the nap pool.

11. The computer system of claim 10 wherein the plurality of pools further includes a standby pool that contains devices in an intermediate power consumption state, a least-recently accessed (LRA) device of the active pool being evicted to the standby pool when the active pool is full and the processor accesses another device, which is neither assigned to the standby nor nap pool.

12. The computer system of claim 11 further comprising:

a first storage location to store an active pool size that defines a maximum number of devices for the active pool.

13. The computer system of claim 12 further comprising:

a second storage location to store a standby pool size that defines a maximum number of devices for the standby pool.

14. The computer system of claim 13 further comprising:

a pointer that points to a LRA device of the standby pool.

15. The computer system of claim 14 further comprising:

a timer that evicts the LRA device of the standby pool to the nap pool after a selected duration of inactivity.

16. The computer system of claim 15 wherein the timer means evicts the LRA of the active pool into either the standby or nap pools when the standby pool is empty and the selected duration of inactivity elapses.

17. The computer system of claim 14 wherein the LRA device in the standby pool is evicted to the nap pool when the active and standby pools are full and the processor accesses another device that is in the nap pool.

18. The computer system of claim 11 wherein an access by the processor to a device in the active pool does not affect the standby or nap pools.

19. The computer system of claim 10 wherein upon a reset condition of the computer system, all of the DRAM devices are assigned to the nap pool.

20. A method of power management for a computer system including a processor that accesses information stored in DRAM devices, the method comprising the steps of:

(a) assigning a most-recently accessed (MRA) device to an active pool associated with a stack, the MRA device being at a top-of-stack (TOS) position, the active pool having a predetermined size with a certain stack position representing a least-recently accessed (LRA) device in the active pool;

(b) evicting the LRA device from the active pool into a standby pool when the active pool is full and the processor accesses another device, which is not currently assigned to the active pool;

(c) identifying a LRA device in the standby pool; and (d) evicting the LRA device from the standby pool into a nap pool upon a timeout condition;

wherein the active, standby and nap pools corresponding to power consumption states with the active pool corresponding to a high power consumption state and the nap pool corresponding to a low power consumption state.

21. The method according to claim 20 wherein the standby pool is also associated with the stack.

22. The method according to claim 20 wherein the timeout condition comprises a number of clock cycles of the processor.

23. The method according to claim 20 further comprising the initial step of:

programming the predetermined size into a register.

24. The method according to claim 20 wherein the standby pool also has a predetermined size, and further comprising the step of:

evicting the LRA device from the standby pool to the nap pool when the standby and active pools are full and the processor accesses another device, which is not currently assigned to either the active or standby pools.

* * * * *

UNITED STATES PATENT AND TRADEMARK OFFICE
CERTIFICATE OF CORRECTION

PATENT NO. : 6,038,673
DATED : March 14, 2000
INVENTOR(S) : Benn et al.

It is certified that error appears in the above-identified patent and that said Letters Patent is hereby corrected as shown below:

In column 3, at line 67, delete "poor" and insert --pool--.
In column 4, at line 1, delete "pool" and insert --poor--.

Signed and Sealed this

Seventeenth Day of April, 2001

Attest:

NICHOLAS P. GODICI

Attesting Officer

Acting Director of the United States Patent and Trademark Office